A. L. DUNCAN.
APPARATUS FOR PROCESSING AND PREPARING FOOD PRODUCTS.
APPLICATION FILED APR. 18, 1913.
1,085,852.
Patented Feb. 3, 1914
2 SHEETS—SHEET 1.
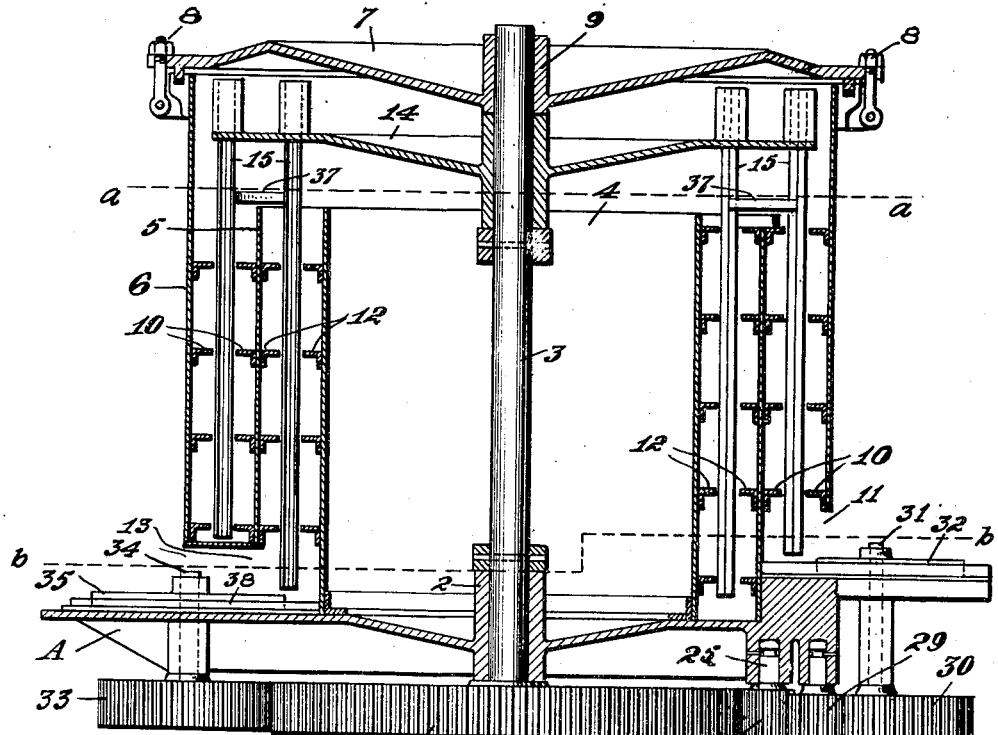
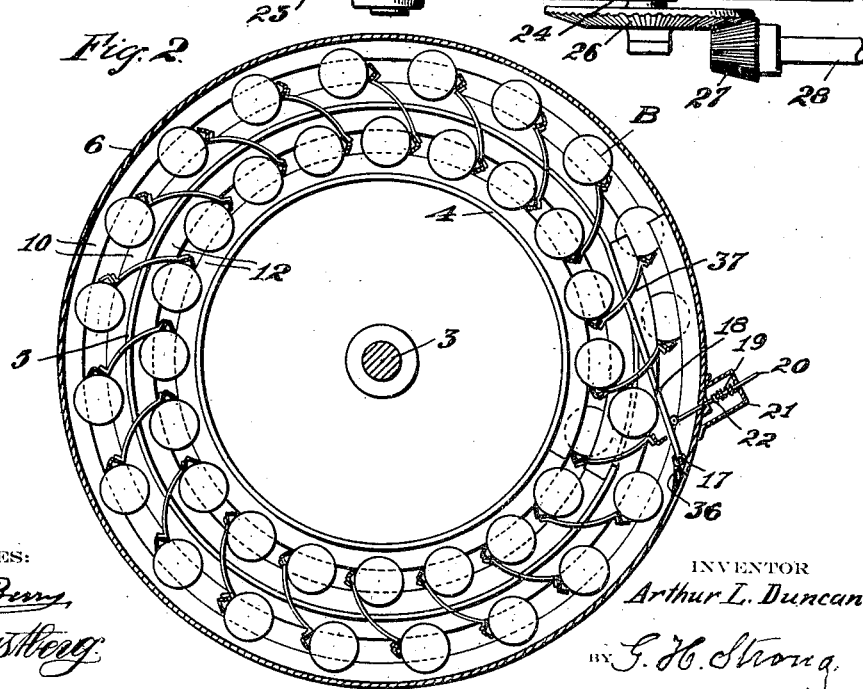
WITNESSES:
INVENTOR
Arthur L. Duncan
BY G. H. Strong
ATTORNEY A. L. DUNCAN.
APPARATUS FOR PROCESSING AND PREPARING FOOD PRODUCTS.
APPLICATION FILED APR. 18, 1913.
1,085,852.
Patented Feb. 3, 1914.
2 SHEETS—SHEET 2.
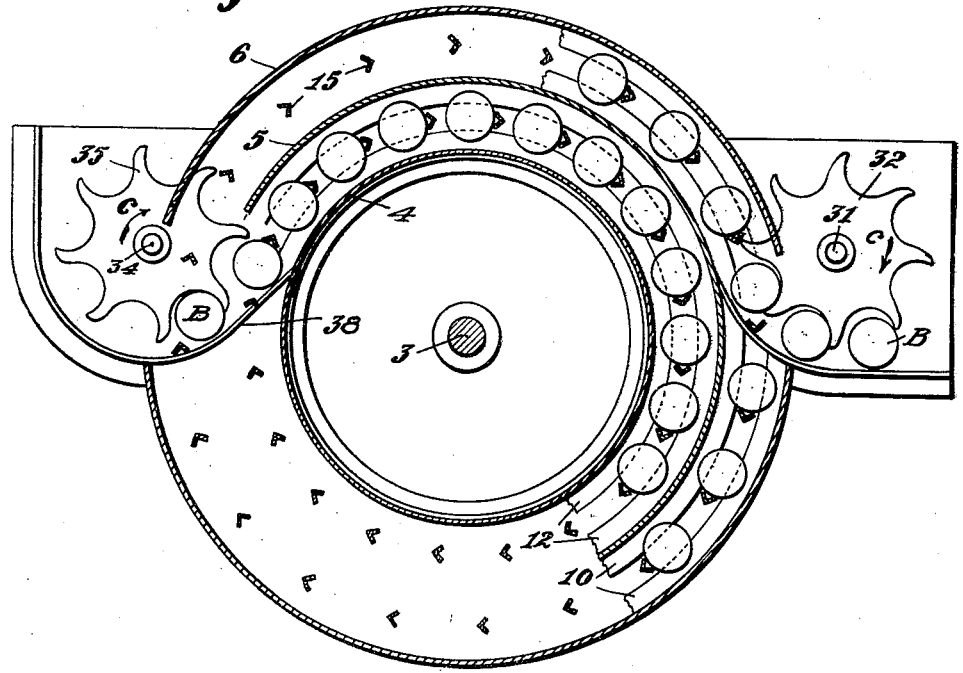
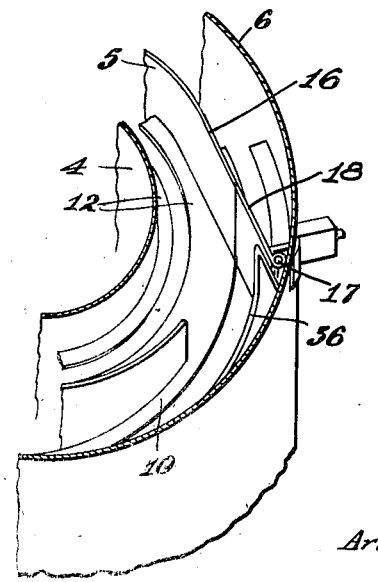

UNITED STATES PATENT OFFICE.

ARTHUR L. DUNCAN, OF FRUITVALE, CALIFORNIA, ASSIGNOR OF ONE-THIRD TO CHARLES E. FORRY AND ONE-THIRD TO EDWIN H. DUNCAN, BOTH OF FRUITVALE, CALIFORNIA.

APPARATUS FOR PROCESSING AND PREPARING FOOD PRODUCTS.

1,085,852.  Specification of Letters Patent.  Patented Feb. 3, 1914.

Application filed April 18, 1913. Serial No. 761,943.

*To all whom it may concern:*

Be it known that I, ARTHUR L. DUNCAN, a citizen of the United States, residing at Fruitvale, in the county of Alameda and State of California, have invented new and useful Improvements in Apparatus for Processing and Preparing Food Products, of which the following is a specification.

This invention relates to an apparatus for processing and preparing food products, and particularly pertains to an apparatus for steam cooking canned fruits, vegetables, and the like.

It is the object of this invention to provide an apparatus by means of which canned food products may be subjected to the cooking action of steam for a predetermined length of time, either before or after sealing of the cans.

A further object is to provide an apparatus of the above character by means of which a uniform cook may be obtained, and which is so constructed and arranged that the cans containing the food product, such as fruit or vegetables, may be delivered continuously thereto and discharged therefrom.

A further object is to provide a steam cooking apparatus which is simple in construction and efficient in operation and capable of being readily assembled and taken apart.

The invention primarily resides in a vertically arranged spiral runway connecting at its top with an internal spiral runway, means for feeding cans or the like to the bottom of the external spiral runway, means for advancing the cans up the external spiral and down the internal spiral, and means for removing the cans from the lower end of the internal spiral.

The invention further consists of the parts and the construction and combination of parts as hereinafter more fully described and claimed, having reference to the accompanying drawings, in which—

Figure 1 is a vertical section of the invention. Fig. 2 is a horizontal section on the line *a—a* of Fig. 1. Fig. 3 is a horizontal section on the line *b—b* of Fig. 1. Fig. 4 is a detail in perspective of the deflector for transferring the cans from the external spiral to the internal spiral.

In the drawings, A represents the bed or base plate of the apparatus, which is formed with a vertically extending hub portion 2, in which a vertical shaft 3 is journaled. Mounted on the base A and surrounding the shaft 3 is a cylinder 4, terminating in an open upper end at any suitable distance above the base A. Surrounding the cylinder 4 and concentric therewith is an intermediate cylinder 5, spaced a short distance from the cylinder 4 and surrounding the intermediate cylinder 5 is an outer cylinder 6 concentric with the cylinder 5 and spaced therefrom. The cylinders 5 and 6 are mounted in any suitable manner on the base A. The upper ends of the cylinders 4 and 5 are approximately in the same plane, while the outer cylinder 6 projects above the upper ends of the cylinders 4 and 5 and is adapted to receive a cap or cover 7, which is designed to inclose the upper end of the outer cylinder 6, and is detachably secured thereto by clamps 8, or in any other suitable manner. The cover 7 is formed with a central hub portion 9, in which the upper end of the vertical shaft 3 is journaled. Mounted on the inner wall of the outer cylinder 6 and on the outer wall of the intermediate cylinder 5, are parallel spiral rails 10, which lead around the intermediate cylinder 5 from a point adjacent the base of the outer cylinder 6; the rails 10 on the cylinders 5 and 6 being slightly spaced apart. The lower ends of the spiral rails 10 terminate in the surface of a raised portion of the base A. An opening 11 is formed in the outer cylinder 6 adjacent the lower end of the spiral rails 10, through which cans, jars, or other containers are introduced into the space between the outer cylinder 6 and the intermediate cylinder 5, as will later be described. The spiral rails 10 lead upward from the opening 11 in the space surrounding the intermediate cylinder 5, and terminate a short distance below the upper edge of the latter. Mounted on the outer wall of the cylinder 4 and the inner wall of the cylinder 5 are spiral rails 12 which lead downward from the upper ends of the cylinders 4 and 5 from a point adjacent the terminations of the spiral rails 10 and passing around the cylinder 4 in the space between the cylinders 4 and 5 terminate at the lower end of the cylinder 4 in the upper face of the base A diametrically opposite the lower terminations of the spiral rails 10 on a plane below the latter. Formed in the cylinders 5 and 6, adjacent to the lower terminations of the spiral rails 12, are openings 13, through which the cans or containers are discharged, as will later be described.

Rigidly mounted on the upper portion of the shaft 3 is a horizontally extending disk or circular plate 14, which projects over the upper ends of the cylinders 4 and 5. Securely mounted on the disk 14, adjacent its periphery and depending therefrom, is a series of vertical bars or fingers 15, which are arranged in two concentric rows; the inner row extending downwardly into the space between the inner cylinder 4 and the intermediate cylinder 5 between the parallel spiral rails 12, while the outer row extends downward into the space between the intermediate cylinder 5 and the outer cylinder 6 between the spiral rails 10, as shown in Fig. 1. The fingers 15 are preferably formed of angle irons, so as to provide a V-shaped vertical channel on one side thereof.

The upper end of the intermediate cylinder 5 is cut away at a point adjacent the intersection of the spiral rails 10 and 12, and a diagonal plate 16 connects with one side of the opening thus formed and extends at an angle partially across the space between the intermediate cylinder 5 and the outer cylinder 6.

Pivotally mounted at 17 on the outer cylinder 6 is a gate 18, the outer edge of which closes against the outer end of the angular partition 16, as shown in Fig. 4; the gate 18 is normally retained in its closed position by means of a spring 19, wound on a stem 20, pivotally connected to the back of the gate 18; said spring bearing between a bracket or housing 21, mounted on the cylinder 6 and a collar 22 on the stem 20. The gate 18 and the partition 16 form a deflector for directing cans from the spiral rails 10 to the spiral rails 12 at their upper ends; the gate 18 being provided to permit the passage of the fingers 15 in the outer row through the deflector.

Mounted on the lower end of the shaft 3, under the base A, is a toothed wheel 23 which meshes with a pinion 24 mounted on a stud shaft 25, supported in a suitable bearing on the base A, and carrying a bevel gear 26 on its lower end which meshes with a bevel pinion 27 on a drive shaft 28. Meshing with the toothed wheel 23 is an idler pinion 29, also meshing with a toothed wheel 30 on the lower end of a vertical shaft 31, extending upward through a bearing formed on the base A; the shaft 31 having a horizontally disposed star wheel 32 rigidly mounted on its upper end. The outer periphery of the star wheel 32 extends into the opening 11 in the outer cylinder 6; the star wheel 32 being provided for the purpose of feeding cans or like articles into the space between the cylinders 5 and 6 in the manner commonly employed in can-handling machinery. Meshing with the toothed wheel 23, opposite the toothed wheel 30, is a toothed wheel 33, mounted on the lower end of a shaft 34, extending upward through the base A and having a horizontally disposed star wheel 35 on its upper end. The star wheel 35 extends through the openings 13 in the cylinders 5 and 6, and is provided for the purpose of removing the cans in the space between the cylinders 4 and 5.

In the operation of the invention, the materials to be cooked are placed in suitable cans, indicated at B in Figs. 2 and 3, which cans are fed to the star wheel 32 in any suitable manner. The shaft 28 on being rotated from any suitable source of power revolves the beveled pinions 27 and 26, shaft 25, pinion 24, toothed wheel 23, idler pinion 29 and toothed wheels 30 and 33. The rotation of the toothed wheels 30 and 33 rotates the star wheels 32 and 35 through the shafts 31 and 34 in the direction of the arrows c in Fig. 3. The rotation of the toothed wheel 23 causes the shaft 3 to revolve and carry the disk or plate 14 therewith, thus causing the fingers 15 to travel in a circle between the spiral rails 10 and 12. A can B being fed to the star wheel 32 is engaged by the latter and fed into the space between the cylinders 5 and 6; the star wheel 32 being so shaped and timed in relation to the travel of the fingers 15 as to introduce a can B into the space between the successive fingers 15 in such manner that each finger 15 will come in contact with a can as it is moved in front thereof by the star wheel 32. The lower ends of the fingers 15, engaging the cans delivered thereto by the star wheel 32, cause the cans to advance upwardly on the external spiral rails 10 until they reach the upper ends of the latter, whereupon the cans come in contact with a deflector 36, formed on the inner wall of the cylinder 6, immediately in front of the pivotal mounting 17 of the gate 18. The deflector 36 operates to move the can horizontally from in front of the finger 15 against the deflector plate 16 and out of the path of travel of the finger 15. The can is then engaged by a horizontal plate 37, carried by the fingers 15. A plate 37 connects with each of the fingers 15 in the outer row and extends over the upper edge of the intermediate cylinder 5, and connects with a finger 15 on the inner row, as shown in Fig. 2. A plate 37, on engaging a can B at the upper end of the spiral rails 10, causes the can to travel inwardly on to the upper end of the spiral 12 in front of the finger 15 on the inner row, which finger causes the can to advance downwardly on the spiral 12 to a point opposite the openings 13 in the intermediate cylinder 5 and the outer cylinder 6, as shown in Fig. 3. The can on reaching this point comes in contact with a deflector 38 and is fed to the periphery of the star wheel 35, which operates to engage the can B and discharge it through the openings 13.

From the foregoing it will be seen that the cans B may be fed continuously to the apparatus by the star wheel 32 and be carried continuously up the spiral 10 and down the spiral 12 by the action of the revolving fingers 15, and be delivered from the apparatus by the star wheel 35.

To perform the cooking operation, steam is admitted into the spaces between the cylinders 4 and 5 and the cylinders 5 and 6 in any suitable manner, not necessary to be here shown; the steam forming the medium for cooking the contents of the cans B. By timing the rotation of the gears the length of time required for a can to pass through the apparatus may be varied to suit different conditions. By arranging the spiral tracks vertically, as described, the cans B may be passed through the apparatus either before or after being sealed; the cans B moving up and down the spiral rails 10 and 12 in either a vertical or horizontal position. By providing different spiral rails, one to carry the cans up and the other to carry the cans down, the apparatus may be rendered compact and a long distance of travel be obtained in a short space.

Having thus described my invention, what I claim and desire to secure by Letters Patent is:

1. In a processer, a casing, an inner and an outer spiral trackway within said casing, a series of vertically disposed fingers extending between the spiral rails of said trackway, means for propelling said fingers in a circular path of travel, means for delivering cans to the lower end of the outer trackway in position to be engaged by the outer fingers to cause them to be advanced upward in the outer trackway, means for directing the cans from the outer trackway to the inner trackway into the path of travel of the inner fingers, said means including a deflector at the junction of the tracks, of the outer and inner series, whereby the cans may be caused to move to the lower end of the inner trackway, and means for removing the cans from said inner trackway.

2. In a cooking apparatus, a steam chamber having a removable cover, spaced concentric cylinders interior to the outer chamber and of a less height, a pair of vertically-disposed spiral trackways supported upon the cylinder and casing walls, one trackway being arranged within the other, a vertical shaft journaled axially in the steam chamber, a series of depending fingers carried by the said shaft extending between the rails of said trackways and adapted to travel between said rails on the rotation of said shaft to advance cans up the outer trackway, a deflector located above the tops of the inner cylinders and plates connecting the outer and inner carrying fingers above said cylinders to automatically transfer the cans from one trackway to the other.

3. In a cooking apparatus, a steam chamber, a pair of vertically disposed spiral trackways, one arranged within the other, a vertical shaft journaled axially in the steam chamber, a series of depending fingers carried by the said shaft extending between the rails of said trackways and adapted to travel between said rails on the rotation of said shaft to advance the cans up the outer and down the inner trackway, a deflector and co-acting connecting plates between the outer and inner fingers for directing the cans from the upper end of the outer track to the inner track, a motor shaft and gears transmitting motion to the vertical shaft, supplemental gears having vertical shafts extending through the base on opposite sides of the chamber, and star wheels carried thereby, one co-acting to deliver cans to the outer track and the other to remove cans from the inner track.

4. In a cooking apparatus, a steam chamber, a pair of vertically disposed spiral trackways, one arranged within the other, a vertical shaft extending into the steam chamber, a series of depending fingers carried by said shaft and extending between the rails of said trackway and adapted to travel between said rails on the rotation of said shaft to advance cans up the outer trackway and down the inner trackway, means for directing the cans from the upper end of the outer trackway to the inner trackway, consisting of a deflector plate mounted in the steam chamber for moving the cans out of the path of travel of one row of fingers and a can-engaging plate carried by the fingers arranged to advance the can in the path of travel of the inner row of fingers.

5. In a cooking apparatus, a steam chamber, a pair of vertically disposed spiral trackways, one arranged within the other, a vertical shaft extending into the steam chamber, a series of depending fingers carried by said shaft and extending between the rails of said trackway and adapted to travel between said rails on the rotation of said shaft to advance cans up the outer trackway and down the inner trackway, means for directing the cans from the upper end of the outer trackway to the inner trackway, consisting of a deflector plate mounted in the steam chamber for moving the cans out of the path of travel of one row of fingers, a can-engaging plate carried by the fingers arranged to advance the can in the path of travel of the inner row of fingers, means for delivering the cans to the lower end of the outer trackway and means for discharging the cans from the lower end of the inner trackway.

In testimony whereof I have hereunto set my hand in the presence of two subscribing witnesses.

ARTHUR L. DUNCAN.

Witnesses:
　JOHN H. HERRING,
　W. W. HEALEY.